United States Patent [19]

Major

[11] 4,325,127
[45] Apr. 13, 1982

[54] FLOW METER SYSTEM

[76] Inventor: Emery Major, 17 Skylark Dr. #1, Larkspur, Calif. 94939

[21] Appl. No.: 98,739

[22] Filed: Nov. 30, 1979

[51] Int. Cl.³ .............................................. F01L 25/08
[52] U.S. Cl. ...................................... 364/510; 91/275; 137/595; 137/862
[58] Field of Search .................... 364/510; 137/14, 51, 137/311, 331, 595, 862; 222/17; 169/19; 91/275, 361, 459, 382

[56] References Cited

U.S. PATENT DOCUMENTS

| | | | |
|---|---|---|---|
| 3,608,572 | 9/1971 | Hass | 364/510 X |
| 3,775,028 | 11/1973 | Davis | 91/175 X |
| 3,954,045 | 5/1976 | Barlow | 91/459 X |
| 4,023,020 | 5/1977 | Lestradet | 364/510 X |
| 4,052,003 | 10/1977 | Steffen | 364/510 X |
| 4,103,695 | 8/1978 | Aono | 364/510 X |
| 4,162,750 | 7/1979 | Demers et al. | 91/175 X |
| 4,189,005 | 2/1980 | McLoughlin | 364/510 X |

Primary Examiner—Edward J. Wise
Attorney, Agent, or Firm—Thomas R. Lampe

[57] ABSTRACT

A selectively energizable flow meter system comprising a valve having at least one fluid inlet port for receiving fluid under pressure and a plurality of fluid distribution ports and including a valve element selectively movable to direct liquid to predetermined fluid distribution ports, a metering device, and valve element positioning mechanism connected to the valve element. The valve element positioning mechanism is operable upon energization of the system to establish fluid flow communication between the metering device and at least one valve fluid distribution port and responsive to de-energization of the system to direct pressurized fluid entering the valve fluid inlet port to a valve fluid distribution port bypassing the metering device.

20 Claims, 9 Drawing Figures

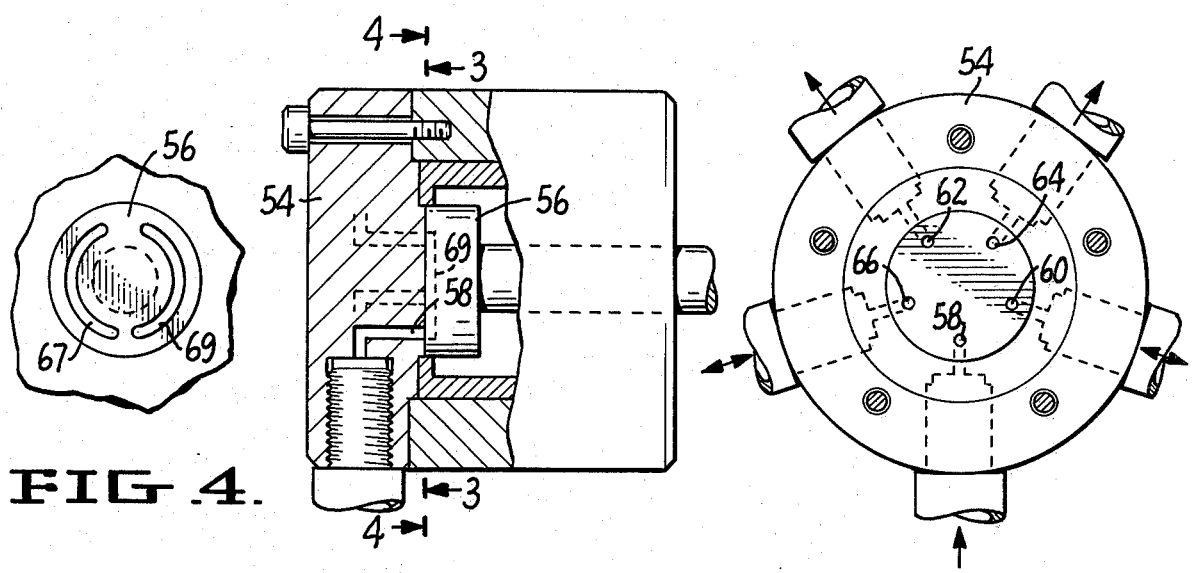
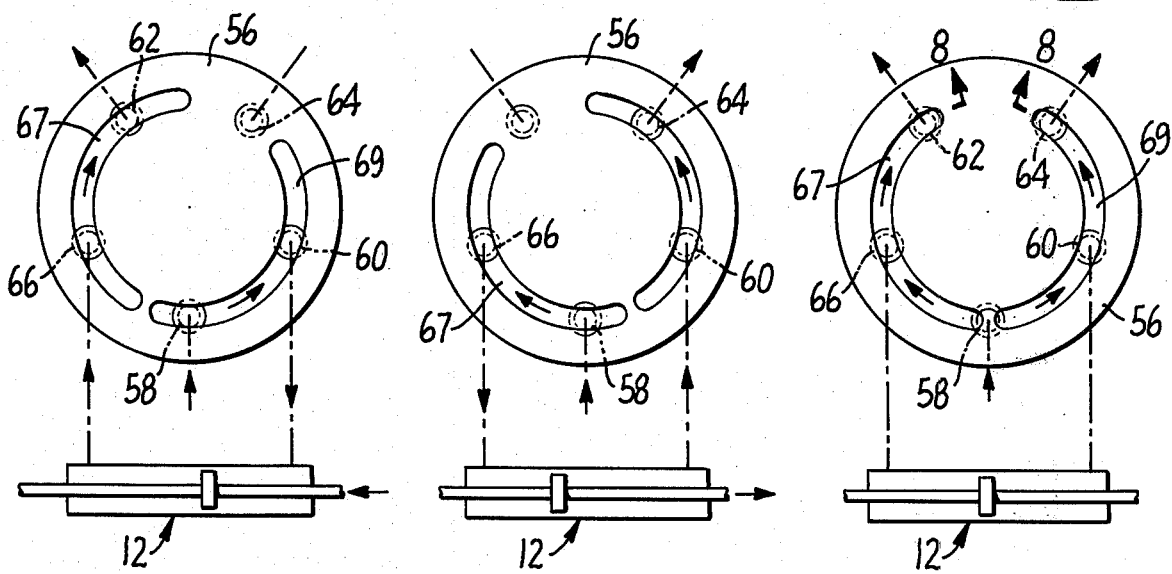
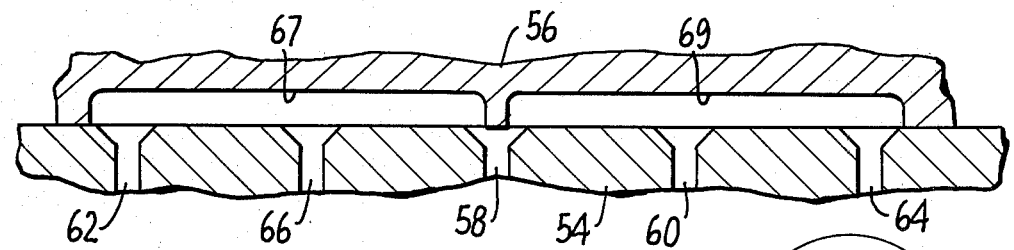
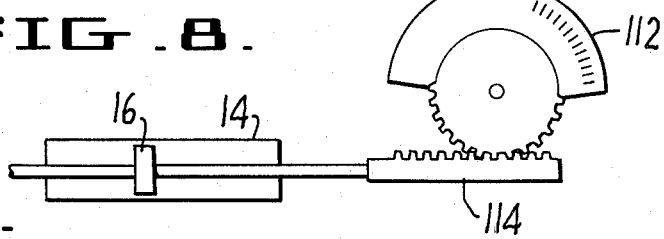

FLOW METER SYSTEM

BACKGROUND OF THE INVENTION

The present invention relates to flow meters, and more particularly, relates to a selectively energizable flow meter system adapted to accurately meter the flow of pressurized fluid continuously delivered to the system as by means of a high pressure pump. During operation of the system the pressurized fluid passes through both a valve means and metering means incorporated in the system. When the system is de-energized, means is provided to adjust a movable valve element of the valve means so as to bypass the metering means and prevent harmful pressure build-up in the system due to the continuing functioning of the high pressure pump.

SUMMARY OF THE INVENTION

According to the present invention, a fluid flow meter system is provided which is highly accurate and reliable in construction and readily lends itself to the metering of high pressure fluid being continuously delivered thereto. The system includes a valve means defining at least one fluid inlet port for receiving the fluid under pressure and a plurality of fluid distribution ports. The valve means includes a valve element selectively movable to direct the liquid to predetermined fluid distribution ports. The valve means directs the fluid to metering means having a reciprocating metering element movable between two positions. Valve element positioning means is connected to the valve element to selectively position same when the metering element reaches each of said positions. Thus, pressurized fluid will be continuously delivered to the metering means along alternative flow paths interconnecting the metering means and valve means. Movement of the metering element under the urging of the pressurized fluid will in turn force an equal amount of fluid from the metering means back through the valve means. The valve element positioning means is operable upon de-energization of the system to direct pressurized fluid entering the valve means fluid inlet port to a valve means fluid distribution port bypassing the metering means.

Other objects and characteristics of the invention will be apparent from the following more detailed description and accompanying drawings in which:

DESCRIPTION OF DRAWINGS

FIG. 2 is an enlarged detailed partial broken away view illustrating the operative details of stator and rotor components of the valve means of the apparatus;

FIGS. 3 and 4 are sectional views taken along lines 3 and 4, respectively, of FIG. 2;

FIGS. 5-7 are schematic presentations showing interaction between the valve means and metering means at various stages of operation;

FIG. 8 is a view taken along line 8—8 of FIG. 7; and

FIG. 9 is a schematic side view of an alternative form of signal element that may be employed in association with the valve means of the apparatus.

DETAILED DESCRIPTION

Figure 1:
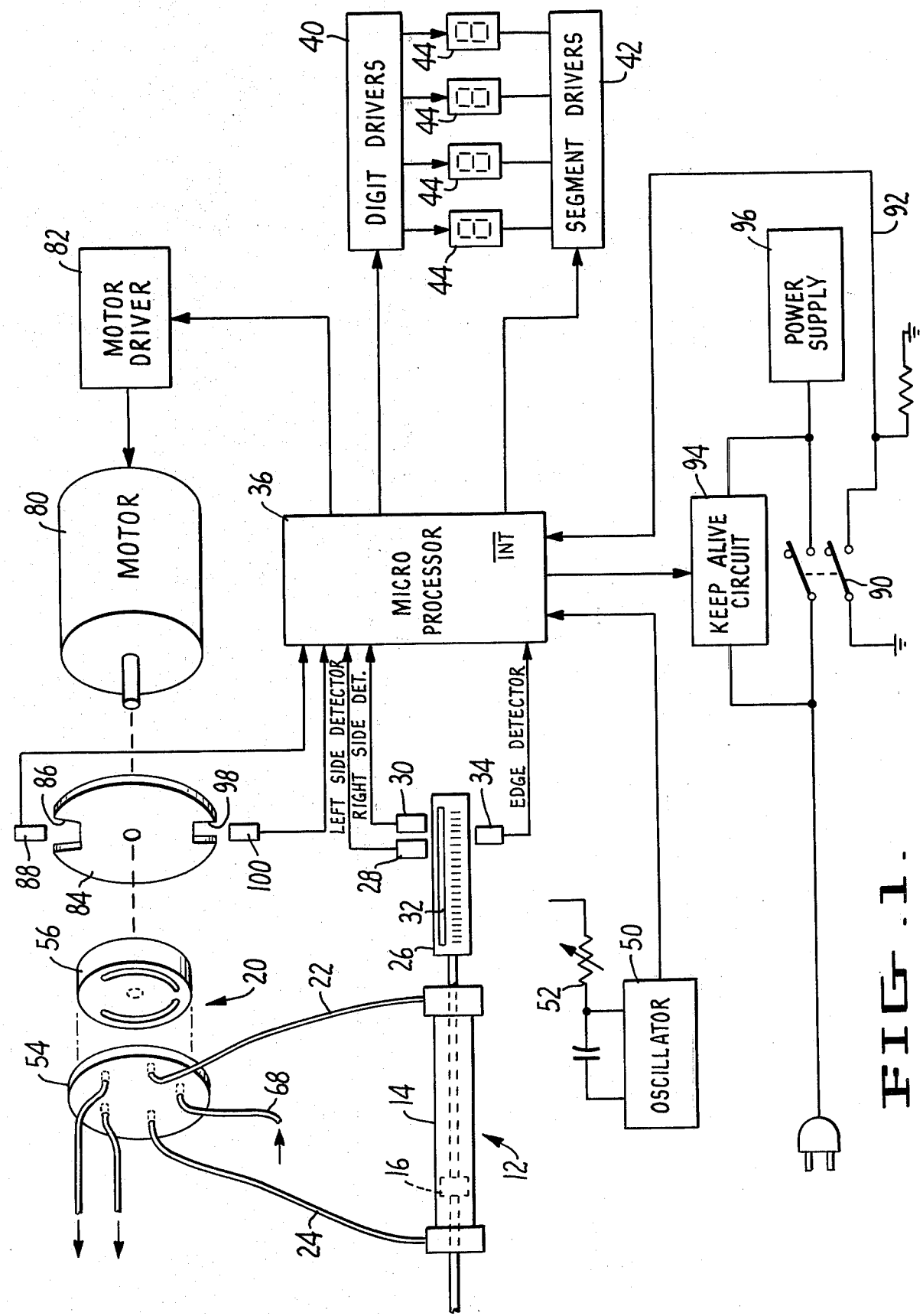
FIG. 1 is a schematic diagram of apparatus incorporating the principles of the invention.

Referring now to FIG. 1, a preferred form of apparatus constructed in accordance with the present invention includes a metering device generally designated by the reference number 12 and comprising a cylindrical housing 14 having a reciprocating metering element in the form of a piston 16 slidably disposed therein in fluid tight relationship. At the ends thereof the interior of housing 14 is in fluid flow communication with a valve 20 through conduits 22 and 24. It will be appreciated that pressurized fluid flowing from the valve through one of the conduits will cause piston 16 to move in a predetermined direction within the housing thus forcing fluid from the housing through the other conduit and back to the valve.

Means is provided for detecting when the piston 16 is at a predetermined location in the housing. The detecting means includes a signal element 26 disposed outside the housing and connected to piston 16 as by means of a rod projecting into the housing. It should be noted that the rod projects from both ends of the piston to ensure that volume changes occur equally in the housing upon piston movement. Optical switches 28 and 30 detect the end of travel for the reciprocating piston 16 by sensing the ends of a slot 32 formed in the signal element. Signal element 26 also has indicia formed thereon sensed by photoswitch 34. The outputs of optical switches 28 and 30 and photoswitch 34 are connected to microprocessor 36 which incorporates suitable circuitry to calculate the flow rate within metering device 12 by measuring the time interval between edge transitions from photoswitch 34. Digit drivers 40 and segment drivers 42 are connected to such circuitry. The microprocessor sends time multiplexing segment information to the segment drivers 42 and scans the four digit drivers 40 to display the flow rate on four LEDs 44. An oscillator 50 with a variable resistor 52 is connected to the microprocessor to permit calibration of the metering device.

The microprocessor employed in the disclosed arrangement is preferably the Model 8048 microcomputer commercially available from Intel Corporation, suitably programmed to perform the functions attributed to microprocessor 36 herein. It will be appreciated that other alternative suitable circuitry for performing the microprocessor functions may be employed as desired.

As may best be seen with reference to FIGS. 1–4 valve 20 includes a stator 54 and a rotor 56. Stator 54 has five ports formed therein, namely a fluid inlet port 58 and a plurality of fluid distribution ports 60, 62, 64 and 66. Through a conduit 68 fluid inlet port 58 is connected to the source (not shown) of high pressure fluid to be introduced into the system. Rotor 56 has arcuate channels 67 and 69 formed therein for selective communication of the ports through the channels upon rotation of the rotor. The rotor is movable between two extreme positions, the first of which shown in FIG. 5 results in high pressure fluid passing from inlet port 58 to fluid distribution port 60 and thence through conduit 22 to the metering device, and the second of which shown in FIG. 6 results in fluid passing from the inlet port through distribution port 66 and conduit 24 through the metering device. At the same time one of the channels formed in the rotor completes the fluid path between the inlet port and one of the distribution ports leading to the metering device, the other of said channels completes a fluid flow path between the distribution port connected to the discharge end of the metering device to one of ports 62 and 64 which deliver fluid from the system after it has been metered.

Rotor 56 is connected to the output shaft of a reversible motor 80, said motor serving to move the rotor between the two extreme positions just described. Motor 80 is in operative association with motor driver 82 which receives a signal from microprocessor 36 when optical switches 28 and 30 detect the end of travel for the reciprocating piston 16. The motor driver 82 will then become activated and reversible motor 80 will continue to turn until fluid flow within the metering device 12 and conduits 22 and 24 is reversed.

Also connected to the output shaft of motor 80 is a disk 84 which turns with the rotor. A gap 86 is formed in the disk with the edges of the disk defining the gap coming into the proximity of optical switch 88 when the rotor has been positioned to reverse flow as previously described. Optical switch 88 will then send a signal to the microprocessor de-activating motor driver 82 and stopping rotation of the motor output shaft. It will appreciated that this activity will be on a continuous basis while the meter system is energized so that a continuous flow of fluid through the metering device and out of the system will occur.

The system is connected to a source of electricity through double pole switch 90 so long as the switch is closed. When the system is de-energized by opening switch 90, interrupt line 92 will detect such action and microprocessor 36 will activate keep alive circuit 94 to maintain the supply of AC power to power supply 96 which is in the form of an AC to DC transformer. Microprocessor 36 will then turn the motor 80 until the valve rotor 56 has reached a safe stop position wherein high pressure fluid entering the valve will bypass the metering device and exit directly from the valve. This position of the rotor is illustrated in FIGS. 7 and 8 wherein the bridge between the channels 67 and 69 is positioned over the center of the inlet port 58 with the other ends of the channels connecting the inlet port directly to ports 62 and 64. In this manner, no potentially harmful pressure build-up will occur in the system even though pressurized fluid is being delivered thereto. At the time the rotor bridge element is centered over the stator inlet port a slot 98 formed in disk 84 will be in alignment with an optical switch 100. When this safe stop position is detected by optical switch 100 it will send a signal to microprocessor 36 to de-activate the keep alive circuit 94 and allow the flow meter system to power down.

It will be appreciated that the system as disclosed may be modified somewhat without departing from the spirit of the invention. For example, FIG. 9 illustrates an alternative form of signal element. The signal element is in the form of a disk 112 having indicia thereon. A rack and pinion arrangement 114 connected to piston 16 will serve to rotate disk 112. This arrangement provides for somewhat greater accuracy during the detecting stage since more of the disk surface will pass by its associated detector switches (not shown) due to piston movement than is the case with the linear signal element shown in FIG. 1.

I claim:

1. A selectively energizable flowmeter system comprising, in combination:
   valve means defining at least one fluid inlet port for receiving fluid under pressure and a plurality of fluid distribution ports, said valve means including a valve element selectively movable to direct said liquid to predetermined fluid distribution ports;
   metering means; and
   valve element positioning means connected to said valve element operable upon energization of said system to establish fluid flow communication between said metering means and at least one valve means fluid distribution port and responsive to de-energization of said system to direct pressurized fluid entering said valve means fluid inlet port to a valve means fluid distribution port bypassing said metering means.

2. The system of claim 1 wherein said metering means includes a housing having a reciprocating metering element slidably disposed therein in fluid-tight relationship therewith, said system additionally comprising a conduit connecting each end of said housing to said valve means whereby pressurized fluid entering a first end of said housing from a first valve means fluid distribution port will displace said reciprocating metering element and cause fluid disposed between the metering element and a second housing end to flow to a second valve means distribution port.

3. The system of claim 2 additionally comprising means for detecting when said metering element is at a predetermined location in said housing, said detecting means being operatively associated with said valve element positioning means to reposition said valve element whereby fluid flow in said housing is reversed and pressurized fluid from the second valve means distribution port enters the second end of the housing to displace the reciprocating metering element and cause fluid disposed between the metering element and the first housing end to flow to the first valve means distribution port.

4. The system of claim 3 wherein said detecting means includes a signal element disposed outside of said housing and fixed to said metering element for reciprocating movement therewith and switch means to detect the location of said signal element.

5. The system of claim 4 wherein said signal element comprises an optical scale having indicia thereon, said system further comprising photoelectric means for detecting said indicia and means operatively associated with said photoelectric means and responsive to the rate of movement of said indicia relative to said photoelectric means for determining the rate of fluid flow through said housing.

6. The system of claim 4 wherein said valve element positioning means includes a reversible electric motor and wherein said switch means comprises spaced optical switches positioned adjacent to said signal element and responsive to movement of said signal element to a predetermined extent to actuate said reversible motor to reposition said valve element whereby fluid flow in said housing is reversed.

7. The system of claim 6 wherein said valve element is a valve rotor driven by the output shaft of said reversible motor, said system further comprising means responsive to rotation of said rotor to de-energize said reversible motor when fluid flow in said housing is reversed.

8. The system of claim 7 wherein said means responsive to rotation includes a disk rotatable with said rotor and an optical switch actuated by movement of said disk relative to said optical switch.

9. The system of claim 1 wherein at least one of said fluid distribution ports is a drain port, said valve element positioning means being responsive to de-energization of said system to direct pressurized fluid entering said valve means fluid inlet port to said drain port.

10. The system of claim 9 wherein said valve element is a valve rotor and wherein said valve element positioning means includes a reversible motor having an output shaft connected to said rotor.

11. The system of claim 10 additionally comprising means for maintaining the reversible electric motor in an energized state upon de-energization of said system to rotate the output shaft of said motor and said valve rotor until said fluid inlet port is in communication with said drain port along a flow path bypassing said metering means.

12. The system of claim 11 additionally comprising means for de-energizing the reversible electric motor when the system is de-energized and the valve rotor has reached the position whereat the metering means is bypassed.

13. The system of claim 12 wherein the electric motor de-energizing means includes an element mounted for rotation with said valve rotor and motor output shaft and switch means responsive to the position of said element.

14. The system of claim 13 wherein the element is a rotating disk having a cutout formed therein and wherein said switch means is an optical photoswitch for sensing the location of said disk cutout.

15. The system of claim 1 wherein said valve means additionally includes a stator element defining said ports, said selectively movable valve element comprising a rotor having channels formed therein for selective communication of said ports through said channels upon rotation of said rotor.

16. The system of claim 15 wherein two of said fluid distribution ports comprise drain ports and wherein two of said fluid distribution ports comprise metering outlet ports in direct fluid flow communication with said metering device.

17. The system of claim 16 wherein said channels are spaced, arcuate channels formed in one side of said rotor, said valve element positioning means adapted to reciprocably rotate said rotor relative to said stator between a first position wherein said inlet port is in fluid flow communication with one of said metering outlet ports through one of said channels and a second position wherein said inlet port is in fluid flow communication with the other metering outlet port through the other of said channels.

18. The system of claim 17 wherein said channels are spaced from one another by a bridge element having a width less than the diameter of said inlet port; said valve element positioning means upon de-energization of said system positioning said bridge element over the center of said inlet port whereby pressurized fluid from said inlet port may enter both of said channels, each of said channels when in said later position being in fluid flow communication with one of said drain ports.

19. A flowmeter system comprising, in combination:
valve means having a movable rotary valve element and defining a fluid inlet port, a drain port and two metering outlet ports;
metering means connected to said metering outlet ports and including a metering element movable between a first position and a second position in accordance with the direction of fluid flow through said metering means;
a reversible electric motor having an output shaft interconnected with said rotary valve element;
means responsive to movement of said metering element to each of said positions to energize said electric motor to rotate said rotary valve element and reverse fluid flow direction through said metering means; and
means responsive to de-energization of said system to rotate said motor output shaft and rotary valve element until said fluid inlet port is in communication with said drain port and fluid entering the fluid inlet port bypasses the metering means.

20. The system of claim 19 additionally comprising means for detecting movement of said metering element to said positions, said detecting means including a signal element connected to said metering element and switch means responsive to movement of said signal element.

* * * * *